(12) United States Patent
Ma et al.

(10) Patent No.: US 11,410,370 B1
(45) Date of Patent: Aug. 9, 2022

(54) SYSTEMS AND METHODS FOR COMPUTER ANIMATION OF AN ARTIFICIAL CHARACTER USING FACIAL POSES FROM A LIVE ACTOR

(71) Applicant: Weta Digital Limited, Wellington (NZ)

(72) Inventors: Wan-duo Kurt Ma, Wellington (NZ); Muhammad Ghifary, Bandung (ID); John P. Lewis, Mountain View, CA (US)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/403,727

(22) Filed: Aug. 16, 2021

Related U.S. Application Data

(60) Provisional application No. 63/233,611, filed on Aug. 16, 2021.

(51) Int. Cl.
*G06T 13/40* (2011.01)
*G06V 40/16* (2022.01)

(52) U.S. Cl.
CPC ............ *G06T 13/40* (2013.01); *G06V 40/174* (2022.01)

(58) Field of Classification Search
None
See application file for complete search history.

(56) References Cited

U.S. PATENT DOCUMENTS

2018/0197322 A1* 7/2018 Sagar ...................... G06T 7/251

* cited by examiner

*Primary Examiner* — Vu Nguyen
(74) *Attorney, Agent, or Firm* — Philip H. Albert; Jiaping Liu; Haynes and Boone LLP

(57) ABSTRACT

Embodiments described herein provide an approach of animating a character face of an artificial character based on facial poses performed by a live actor. Geometric characteristics of the facial surface corresponding to each facial pose performed the live actor may be learnt by a machine learning system, which in turn build a mesh of a facial rig of an array of controllable elements applicable on a character face of an artificial character.

20 Claims, 14 Drawing Sheets

Muscle Model

| Muscle# | Bone Attachment Point for Muscle | Skin Attachment Point for Muscle | Muscle Volume (in cubic mm) |
|---|---|---|---|
| $M_1$ | $(x_1, y_1, z_1)$ | $(u_1, v_1)$ | $V_1$ |
| $M_2$ | $(x_2, y_2, z_2)$ | $(u_2, v_2)$ | $V_2$ |
| $M_3$ | $(x_3, y_3, z_3)$ | $(u_3, v_3)$ | $V_3$ |
| ... | ... | ... | ... |
| ... | ... | ... | ... |
| $M_N$ | $(x_N, y_N, z_N)$ | $(u_N, v_N)$ | $V_N$ |

| Joints | Description | Type of Value |
|---|---|---|
| J | Jaw | Angle |
| E.l | Left Eye | Rotation in 2D |
| E.r | Right Eye | Rotation in 2D |
| ... | ... | ... |

FIG. 3A

Control Values 350

| Eye Area | Position |
|---|---|
| E1 | (X1, Y1, Z1) |
| E2 | (X2, Y2, Z2) |
| ... | ... |

| Jaw Area | Position |
|---|---|
| J1 | (X1, Y1, Z1) |
| J2 | (X2, Y2, Z2) |
| ... | ... |

FIG. 3B

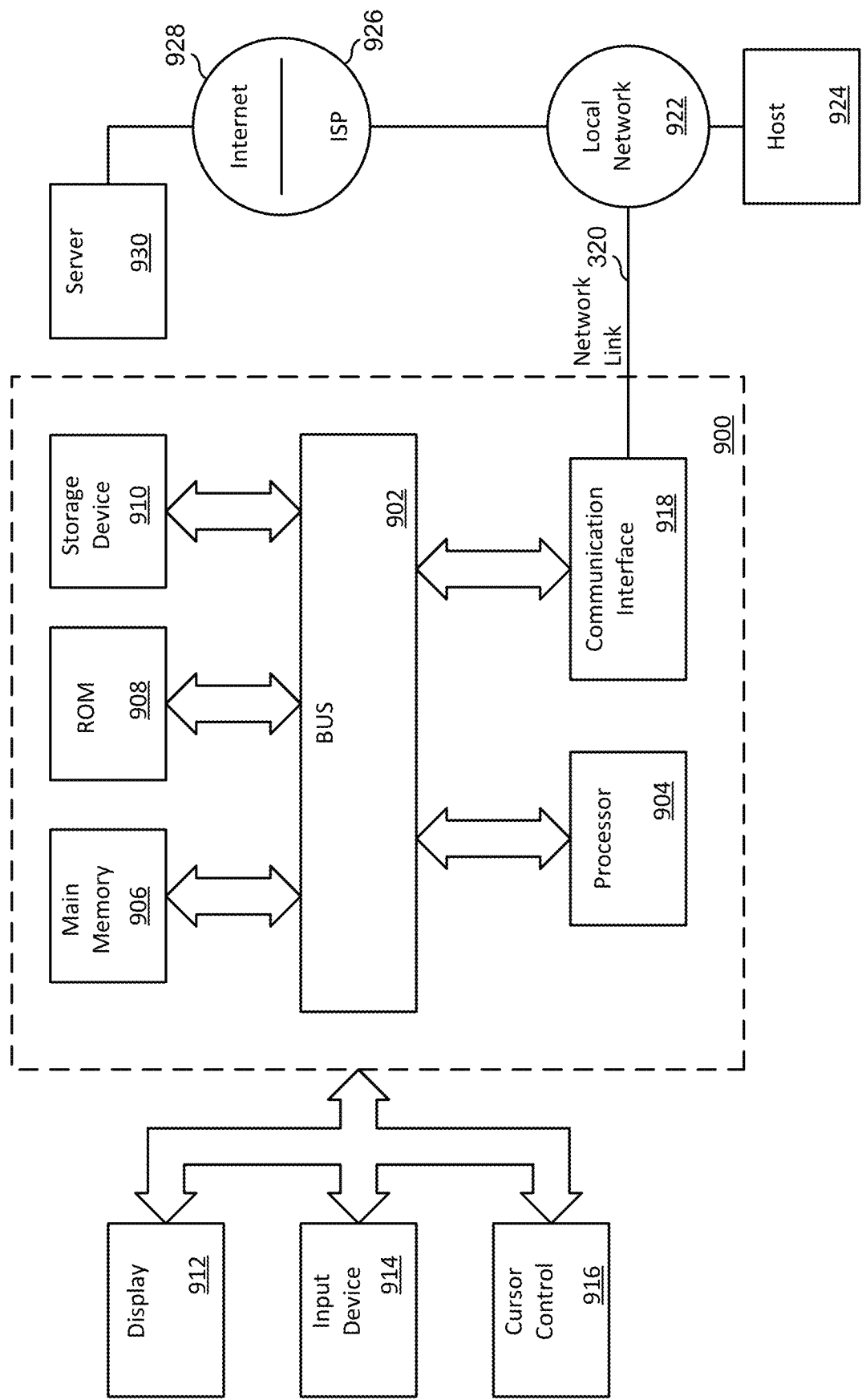

SYSTEMS AND METHODS FOR COMPUTER ANIMATION OF AN ARTIFICIAL CHARACTER USING FACIAL POSES FROM A LIVE ACTOR

CROSS-REFERENCE(S)

The present disclosure is a non-provisional application of and claims priority under 35 U.S.C. 119 to U.S. provisional application No. 63/233,611, filed on Aug. 16, 2021, which is hereby expressly incorporated by reference herein in its entirety.

This present disclosure is also related to U.S. non-provisional application No. 17/403,730, filed on the same day, which is hereby expressly incorporated by reference herein in its entirety.

FIELD

The present disclosure generally relates to tools for generating computer-generated imagery. The disclosure relates more particularly to apparatus and techniques for computer animation of an artificial character using facial poses from a live actor.

BACKGROUND

Many industries generate or use computer-generated imagery, such as images or video sequences. The computer-generated imagery might include computer-animated characters that are based on live actors. For example, a feature film creator might want to generate a computer-animated character having facial expressions, movements, behaviors, etc. of a live actor, human or otherwise. It might be possible to have an animator specify, in detail, a surface of the live actor's body, but that can be difficult when dealing with facial expressions and movements of the live actor, as there are many variables.

Some existing animation systems may recreate, in detail, a skin surface of the computer-animated character that closely resembles a live actor. To simulate the movements and/or facial expression of the computer-animated character that may appear to be similar to those of the live actor, muscle movements performed by the live actor is decomposed and analyzed, which often entails knowledge of an anatomical model of the physical body of the live actor. For example, the anatomical model may include the shape, mass, curvature, and/or other parameters that describe the structure of the muscle layer and the skull of the live actor. The anatomical model can usually include a large number of variables. For example, there are more than 40 skeletal facial muscles that are controlled by seven nerves in a human face. Therefore, building a mathematical topology depicting the three-dimensional structure and movements of the facial muscles can often entail a high degree of computational complexity with compromised system efficiency.

SUMMARY

Embodiments described herein provide a computer-implemented method for generating a first data structure usable for representing an animated facial pose applicable in an animation system to an artificial character. A first set of geometric parameters corresponding to a first set of markers may be received. The first set of geometric parameters represent respective positions of the first set of markers on a face of a human actor, and wherein the first set of geometric parameters correspond to a first facial pose performed by the human actor. A learning system, such as a deep learning network, or other type of error optimizing system, has been trained to learn a transformation from characteristics of the face of the human actor performing a certain facial pose to characteristics of an animated character face performing the same certain facial pose. The deep learning network may transform the first set of geometric parameters into a blendshape of geometric parameters representing positions of a set of controllable elements that are distributed on the animated character face. Geometric position changes of the set of control elements cause a pose change from a first animated facial pose to a second animated facial pose on the animated character face. The first animated facial pose on the animated character face by: a) applying a first subset of control values from the blendshape of geometric parameters to a first subset of the set of controllable elements to generate a first region on the animated character face; b) applying a second subset of control values from the blendshape of geometric parameters to a second subset of the set of controllable elements after the first region is generated to subsequently generate a second region on the animated character face; and c) fine-tuning a resulting animated facial pose constructed by the first region and the second region on the animated character face with a user input modifying the first subset of control values or the second subset of control values. One or more animated facial poses may be generated on the animated character face resulting from varying control values for the set of controllable elements.

In one implementation, the first set of markers includes any combination of physical facial features, such as freckles, moles, wrinkles, etc., a physical marker that is attached on the face of the human actor, a painted marker on the face of the human actor, a virtual marker that is projected on to the face of the human actor.

In some implementation, the first set of markers may be optional, as the system may infer a set of geometric parameters corresponding to positions on the face of the actor.

In one implementation, a time series of observations of the positions of the first set of markers may be obtained. The deep learning network is trained by reconstructing via the deep learning network one or more facial poses on the face of the human actor using the time series of observations of the positions. The trained deep learning network may generate the one or more animated facial poses on the animated character faces.

In one implementation, the set of controllable elements includes one or more control handles that is editable by an animation artist.

In one implementation, the one or more animated facial poses on the animated character face are generated without constructing any mesh of a facial rig based on the face of the human actor to reduce computational complexity.

In one implementation, the applying the first subset of control values to the first subset comprises: determining the first subset of control values from the blendshape of geometric parameters, wherein the first subset of control values reflect first geometric and positional characteristics of an eye area on the character face.

In one implementation, the applying the second subset of control values to the second subset of controllable elements comprises: determining the second subset of control values from the blendshape of geometric parameters, wherein the second subset of control values reflect second geometric and positional characteristics of a jaw area on the character face.

In one implementation, a training dataset of a plurality of sets of positions may be received corresponding to the first set of markers, each set of positions being labeled with a corresponding set of blendshape of geometric parameters on the animated character face. The deep learning network may generate a predicted blendshape of geometric parameters in response to an input set of positions corresponding to the first set of markers. A training objective may be computed by comparing the predicted blendshape of geometric parameters with a set of ground-truth geometric parameters forming a corresponding facial pose on the animated character face. The deep learning network may be updated based on the computed training objective.

In one implementation, the training dataset includes at least set of positions that correspond to a neutral facial pose performed by the human actor.

In one implementation, a modification to control values of the set of controllable elements may be received, via a user interface. The modification includes a position change to a position of at least one controllable element. An updated animated facial pose may be generated by applying the modified control values to the set of controllable elements to the animated character face.

BRIEF DESCRIPTION OF THE DRAWINGS

Various embodiments in accordance with the present disclosure will be described with reference to the drawings, in which:

FIG. 3A illustrates an example of a data structure that might represent a muscle model. In that model, each muscle might be defined by a bone attachment point, a skin attachment point, and a muscle volume, according to embodiments described herein.

FIG. 3B illustrates an example of a data structure that might represent the position data as show in FIG. 2B, according to embodiments described herein.

FIG. 9 is a block diagram illustrating an example computer system upon which computer systems of the systems illustrated in FIGS. 1-12 may be implemented.

DETAILED DESCRIPTION

Figure 1A:
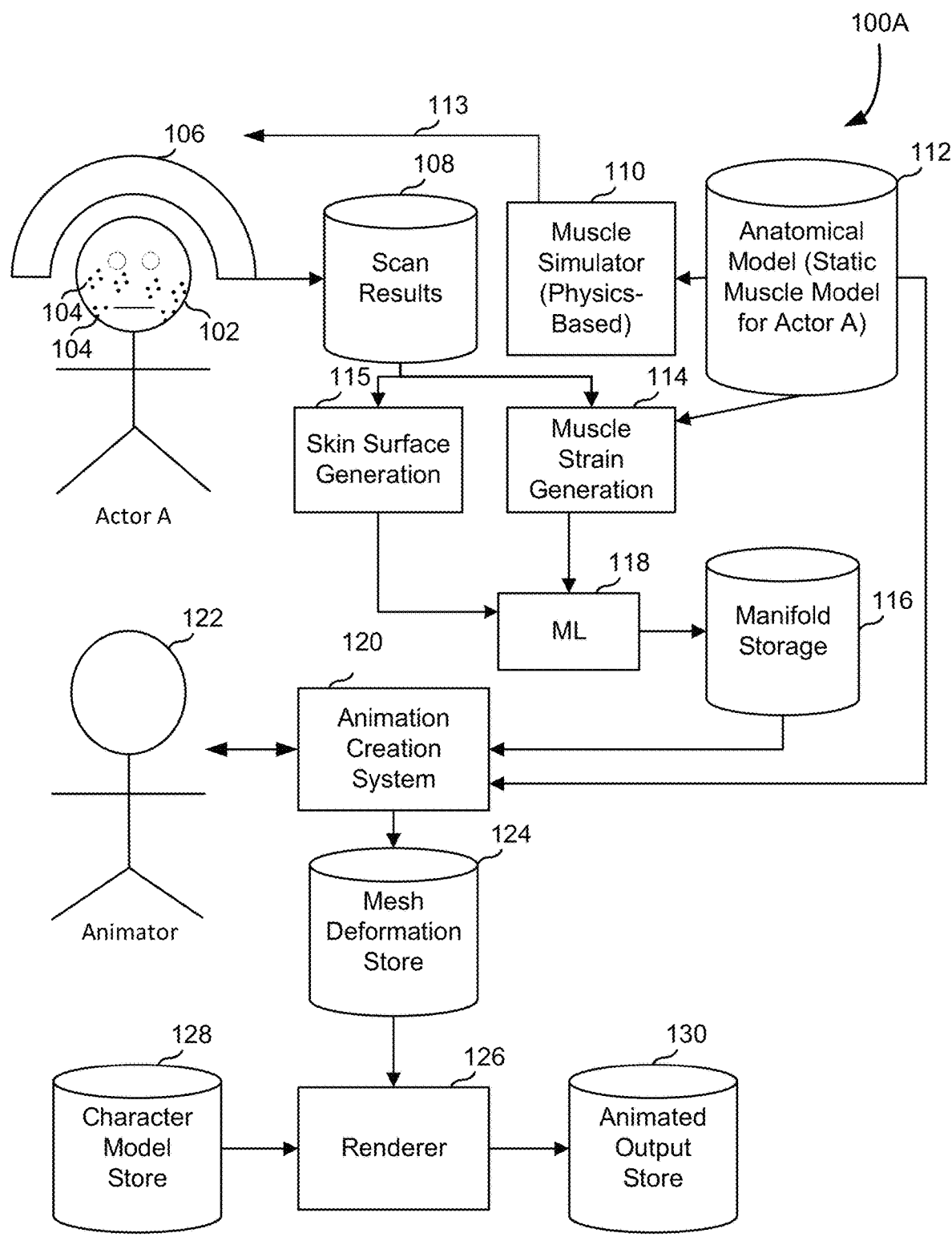
FIG. 1A illustrates an animation pipeline that might be used to render animated content showing animation of a character based on a machine learning model that is trained from scans of a live actor, according to one embodiment described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Video applications nowadays may adopt computer-animated technology to create simulated characters, human or non-human, to appear a video. For example, the film industry has been using computer animation to generate characters that is often physically difficult or even impossible to be played by human actors. The physical appearance of such computer-animated characters may be designed and controlled by an animator, via configuring time-varying parameters to simulate the muscle, joint and bone structures and movements of a living creature, human or non-human. In this way, the computer-animated character may be created to emulate the persona of a real living creature.

As used herein, an animator may refer to a human artist, filmmaker, photography image creator, or the like, who seeks to generate one or more images (such as a video sequence forming an animation) based on animator input and other data available to the animator. In some embodiments, the animator might be an automated or partially automated process. Animator inputs might include specifications of values for positions of movable elements. For example, an articulated character's movement might be specified by values of each available joint in the character.

As used herein, a mesh may refer to a surface representing a facial pose of a human actor. For example, mesh deformations may be derived for different facial poses performed by the human actor.

As used herein, a blendshape may refer to a set of off-set vectors. For example, a blendshape may comprise a set of control values representing position data of a set of markers distributed on different locations of a face of a human actor. Such position data, or position coordinates, may represent the off-set control values, to be added on the basic shape (e.g., a neutral facial pose) to represent a particular facial pose.

As used herein, a rig may refer to a representation of data that corresponds to elements of a character, the allowed movements, etc. One such rig is a facial rig. An animator might be provided with a user interface of an animation creation system that allows the animator to input values for various movable elements of the facial rig. Some movable elements might be a jaw and a collection of muscles. From a specification of provided variables of the movable elements of the facial rig, the animation creation system can generate a pose of the facial rig. For example, when variables corresponding to an amount of contraction for the muscles on either side of the mouth are set to values that represent maximum contraction of those muscles, the animation creation system would output a pose with a face having a widened mouth. By varying the variables from frame to frame, and thus changing poses from frame to frame, animation creation system can output positions of elements, thicknesses of elements, etc., which might be provided as input to a rendering system.

A state of a facial rig corresponding to a particular expression, movement, or placement of elements of the facial rig so as to convey an expression or positioning of facial elements might be represented in computer memory as a data structure such as a strain vector. A strain vector might have components representing jaw position, eye positions, and strain values for each muscle in the facial rig that can be specified by the strain vector. Thus, a particular expression of a live actor can be represented by a strain vector and that strain vector can be used to move or position elements of a facial rig —of that live actor, of a fanciful character, etc.—for generating computer-generated imagery. In some embodiments, the strain value components are one per muscle each having a value representing a present strain value for its corresponding muscle. A strain value might have a fixed value for a muscle in a neutral position for that muscle and a range of values covering contractions relative to the neutral position relaxations relative to the neutral position. In a very specific embodiment, a neutral position value for a strain is zero, a strain value for a muscle contracted relative to the neutral position is a negative number, and a strain value for a muscle relaxed relative to the neutral position is a positive number. The strain value in that specific embodiment might correspond to a length assigned to the muscle in the corresponding position.

Given that a facial rig might comprise a large number of muscles, manually and individually setting each muscle's strain value in the strain vector can be a tedious process and it can be hard to manually match the strain vector component values to a desired state or expression.

In one embodiment, an animator can generate animation of a face of a character making an expression, perhaps talking according to certain speech, and moving around by inputting, or otherwise specifying or determining, a set of strains, wherein a strain is a metric of a muscle that can be moved. In an example, a strain of a muscle is represented as a numerical value where 0.0 corresponds to the muscle in a rest or default position, a positive number corresponds to muscle contraction and a negative number corresponds to muscle relaxation. For example, the numerical value for a strain, $S_M$, of a muscle, M, might be as expressed in Equation 1.

$$S_M = (\text{rest\_length}(M) - \text{length}(M))/\text{rest\_length}(M) \quad \text{(Eqn. 1)}$$

In an embodiment described herein, expressions of an actor are determined for example, by scanning the actor's face to capture scanned data, which can identify how points on the surface of the actor's face move in three dimensions. A number of expressions can be scanned. While it is generally known which muscles are present in a face of a well-studies species, such as humans, there can be variability in where the muscles are attached, which are activated, where both ends are attached, their thicknesses, and what range of strains are possible. For example, a person with a "jowly" face would have different values for those than a person with a non-jowly face. As another example, there are some actors who are able to strain muscles (i.e., move them away from their rest positions) to cause their ears to wiggle and there are others who cannot strain those muscles. In some cases, the scanning or expression determination might be done on actors who are no longer living, perhaps from 2D or 3D recordings of the actor when alive.

An animation creation system and animators who use the animation creation system might want a model for a specific live actor, including their skull shape, muscle-to-skull attachment positions, muscle thicknesses, etc., to construct a facial rig that can be animated, but that might not be possible to determine directly from the live actor. One solution is to only rely on scanned expressions and the animator is permitted to create other expressions not directly scanned by specifying a linear combination of the available scans, but that is often constraining. The shape blending system might be treated as a rig that the animator can control by specifying blend shape weights, but for faces, this can be hard. Some results might be less than desirable as a human can create an almost infinite number of facial expressions and not all of those can be captured for blending.

In some embodiments, an AI system can generate a trained manifold based on inputs from the scan results, dynamic muscle activations, and an anatomical model. A physics-based muscle simulator might be used to generate dynamic muscle activations that are then consumed by the AI to produce a trained manifold. The anatomical model, for example, may include the muscle topology of the specific live actor, e.g., shape, length, position, distribution, mass, and/or the like, of the facial muscles, and the skull surface of the specific live actor, e.g., the shape, dimension, curvature parameters, and/or the like of the skull.

Thus, a difficulty with animating a face using muscle topology model is that there are a large number of facial muscles and specifying a strain for each can be tedious, especially where many scenes need to be created. For example, there are more than 40 skeletal facial muscles that are controlled by seven nerves in a human face. To build a mathematical topology of the facial muscle structure, track its movement and mapping the facial muscle movements to that of a character face of an artificial character, would only induce computational complexity exponentially.

Embodiments described herein provide an alternative approach of animating a character face of an artificial character based on facial poses performed by a live actor. Instead of tracking facial muscle movements of a complex three-dimensional facial muscle topology, geometric characteristics of the facial surface corresponding to each facial pose performed the live actor may be learnt by a machine learning system, which in turn build a blendshape of an array of controllable elements applicable on a character face of an artificial character.

For example, an array of markers may be mounted on the face of the live actor, which capture, instead of facial scan of muscle strains, position parameters capture the geometric characteristics of the array of markers as corresponding to a particular facial pose. The machine learning system may in turn translate the position parameters into control values indicating the positions of the controllable elements on the character face of the artificial character. In this way, the constructed blendshape of controllable elements may be used to animate a particular facial pose on the character face using the machine learning system generated control values.

In one embodiment, the machine learning system may be trained with position data of the finite number of markers, and each position may be represented by a set of three-dimensional coordinates, e.g., (X, Y, Z), of a respective marker. In this way, the computational degree required for the training process may be largely reduced compared with the muscle topology based animation system.

In one embodiment, the machine learning systems may be trained on the features of the markers. For example, the marker feature may include any of the pair-wise distance, the specific angle of the markers. For instance, when the eyes are closed, a specific angle between the upper and lower eye lids decreases, thus this specific angle is used as a marker feature to describe the facial poses relating to closing the eyes. For another instance, when the jaw is opening, the chin marker may have a large distance between the nose marker compared to that in a neutral facial pose. Thus, the distance between the chin marker and the nose marker may be used as a feature relating to facial poses that entails jaw opening. The training data may include a set of marker features of the markers for the human actor, annotated with the corresponding facial pose associated with each set of the specific marker features.

In one embodiment, the animation provided from the animator is configured to create synthetic training marker. Traditionally, a key challenge in solving facial animation is the ambiguity, e.g., it is generally difficult to estimate whether the actor is showing his/her teeth just by looking at the markers without the footages. Specifically, by looking straight at the marker dots, the exact expression from the actor cannot be inferred directly so as the solvers. For instance, if the markers are only attached on the mouth contour, the solver can hardly determine whether the lips are either closed or open unless if more information other than the markers is available. Thus, a naive solver would mislead the final solve by only considering the optimization between the blendshape and the performance marker target. Instead, the animator may avoid this problem by specifying a specific blendshape animation to guide the solver to avoid this ambiguity effectively.

Another observation is that each actor typically has his or her specific way to act the performance (e.g., when some actors are talking, they tend to close the lip a lot, but some actors don't). Those "specific animation" may be captured as a (blendshape) training animation from the perspective that the animator uses for training the facial solver. This guides the facial solver to bias towards to the specific actor's performance.

In one embodiment, to improve computational efficiency of the animation system, a salient point strategy may be adopted to approximate the animation control curves for the set of controllable elements in the animation blendshape. For example, regardless whether the animation control values are built based upon the computationally-efficient position-based animation system, or the muscle model based animation system, control values for animating a facial pose may usually take the form of an animation function of a time-varying value of the control value. For instance, for the computationally-efficient position-based animation system, the animation function may take a form of the time-varying position parameter of the controllable elements. Or alternatively, for the muscle model based animation system, the animation function may take a form of the time-varying muscle strain values of the plurality of muscles corresponding to the character face.

Salient points may be sampled from the animation control curve to result in a set of salient data points that represent the animation control curve and serve as the control input for applying to the control elements. For example, the salient points may be manually selected by an animator via a user interface, where the animator may determine the number of salient points to choose and where the salient points on the curve are chosen. For another example, the salient points may be automatically chosen by a system based on approximation of a cluster of adjacent data points on a segment of the animation curve. The automatically computed salient points may be further fine-tuned by the animator via the user interface. By using a reduced set of sampled salient points as an input to the animation system, computational efficiency can be further enhanced.

As used herein, the term "topology" refers to properties of a geometric object that are preserved under deformations, such as stretching, twisting, crumpling and bending. For example, a facial muscle topology includes a set of data depicting the positions, shapes, and strains of facial muscles.

As used herein, the term "surface" refers to geometric properties of the outside layer of an object. For example, a skull surface includes parameters that describe the geometric properties of the outer layer of the skull, such as the curve, shape, and/or the like.

FIG. 1A illustrates an animation pipeline 100 that might be used to render animated content showing animation of a character based on a model and a rig that is generated from scans of a live actor. As illustrated there, a live actor 102 ("Actor A") might be outfitted with fiducials 104 and have their face, expressions and/or body scanned by a scanner 106. The scanner 106 would then output or store results of scanning to a scan results store 108. The fiducials 104 allow for the scan data that results from scanning to include indications of how specific points on the surface of the face of the live actor 102 move given particular expressions. If the scanner 106 captures data in three dimensions ("3D"), the scan data could also indicate the surface manifold in 3D space that corresponds to the surface of the live actor's face. While it might be expected that the skull of the live actor 102 is a constant shape and changes only by translations and rotations (and jaw movement), it is not expected that the surface manifold would be constant, jaw movements, air pressure in the mouth, muscle movements, and other movable parts move and interact. Instead, different movements and facial expressions result in different thicknesses, wrinkles, etc. of the actor's face.

The output from the scanner 106 may be stored as scan results 108, which may include a skin surface representation, muscle parameters, joint parameters, strain parameters, and/or the like.

In one implementation, the scan results 108 may also be used to generate one or more data bundles of scan results over a data bundle time period T. For example, each data bundle records a respective time-varying vector representing changes of the skin surface, muscle parameters, joint parameters, strain parameters, and/or the like over the data bundle time period T. Further details of the data bundles over a bundle time period are discussed in commonly-owned and co-pending U.S. Provisional application Nos. 63/076,856 and 63/076,858, both filed on September 10, which are both hereby expressly incorporated by reference herein in their entirety.

In one embodiment, it might be assumed that each human actor has more or less the same facial muscles, and more or less the same bone structure in the skull. An anatomical model dataset 112 might be provided that represents muscles, where they connect, what other typical facial elements are present (eyes, eyelids, nose, lips, philtrum, etc.) and other features likely common to most human faces. The anatomical model dataset 112 may also provide a generic skull structure dataset that represents each piece of bone in the skull, the respective position parameters, the respective shape parameters, the respective connector parameter connecting to a neighboring piece, and/or the like. Of course, not all human faces and skulls are identical, and the actual positions of muscles, their thicknesses, where they connect to, how much they can relax and contract, are details that can vary from person to person, as well as the shape of their skull. In this respective embodiment, the anatomical model 112 may represent a customized muscle and/or skull dataset that is specific to Actor A, or alternatively, a generic muscle and/or skull dataset which is pre-stored in the database of anatomical database.

In one embodiment, this anatomical model 112 can be provided to a muscle simulator 110 that performs physics-based muscle simulation and provides a dynamic muscle activations dataset 113 for Actor A.

In another embodiment, the anatomical model 112 may provide a generic muscle model of muscle and skull that can be used as a reference point, together with the scan results 108 of the live actor A to provide, by the muscle generation module 114, a specific muscle topology that is (1) customized to Actor A, and (2) has a simplified approximation structure for machine learning.

In one embodiment, the scan results 108 can also be fed to a skin surface generation module 115, which may in turn extract skin surface data from the scan to the machine learning model 118.

In one embodiment, the generated muscle strains from the muscle strain generation module 114, together with skin representation from module 115, joint representation, and/or the like over a bundle time period, may be input to the machine learning model 118. The machine learning model 118 generates a predicted skin surface representation (e.g., the visible facial expression such as "smile," "frown," etc.). In this way, the machine learning model 118 can learn a transformation between parameters of the muscles, strains, joints, and/or the like and the skin surface representation of actor A through a training dataset in the form of data bundles representing scan results 108 from the actor A. Further details of the training process for machine learning model 118 may be found in FIG. 2A.

In this way, the machine learning system 118 establishes a more accurate (compared to what was traditionally done using generic anatomical data) transformative relationship that is specific to Actor A, between Actor A's skin representation and the underlying muscle/joint movement parameters of Actor A. For instance, the underlying muscle/joint movement parameters may include the positions of the muscles that are moved, strain values, direction of movements, attachment points to the joint, and/or the like., all of which are specific to Actor A.

In one implementation, the machine learning model 118 may be trained to infer the shape of the live actor's skull, volume of muscles, range of motion, etc., to build a manifold of possible movements for the actor. The machine learning model 118 might output a manifold to be stored in manifold storage 116. The manifold might represent the range of plausible expressions. Logically, the manifold might represent a set of solutions or constraints in a high-dimension space corresponding to a strain vector.

For example, the machine learning model 118 may be trained to determine an action locus for the movement or expression adjustment (e.g., from "smile" to "grin") and a range of action (e.g., widened month, showing of teeth, changed upward angle of the mouth, etc.) made by the actor A. The machine learning model 118 may then determine a subset of the muscle strain vector applicable to the range of action, e.g., which muscles are used, and what are the corresponding strains. The machine learning model 118 may determine the manifold that limits changes to the data bundle to changes in the subset of the muscle strain vector. For example, for the movement or expression adjustment (e.g., from "smile" to "grin"), the manifold model 116 may limit the changes to the strain vectors in the data bundle to a subset of muscle strain vectors relating to muscles that widen the month and show teeth, and the corresponding strains that change the upward angle of the mouth.

Correspondingly, the manifold model 116 also limits the search of updated vector values for muscle vectors or strain vectors to a manifold of allowed values for an updated cache of data vectors when the movement or expression adjustment (e.g., from "smile" to "grin") takes place. The manifold model 116 of allowed values correspond to known feasible expressions of the live actor.

Using an animation creation system 120, an animator 112 could generate meshes that correspond to facial expressions of the live actor for whom the muscle model was derived. A mesh might be stored in a mesh deformation store 124. If mesh corresponded to the facial surface of Actor A, the animation creation system 120 could be used by the animator 122 to generate a facial surface of an expression that was not specifically made by Actor A, but would be near what it would be if Actor A had tried that expression. The animation creation system 120 might constrain an animator's inputs by projecting them onto the manifold, which would have an effect of transforming animator inputs that are not corresponding to a plausible expression into a strain vector that does correspond to a plausible expression. The animator's inputs might be represented in memory as a strain vector, having components corresponding to some facial muscles, as well as other animation variables that might not be related to muscles or that are more easily represented directly, such as jaw movement, eye movement, and the like. A strain vector might be represented by an array of values, wherein a value in the array corresponds to a vector component that is a value of strain in a particular dimension, representing strain on one muscle perhaps.

As for inputs and outputs of an animation creation system 120, inputs might include an input strain vector, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 120 can determine the volumes occupied by the muscles, and thus the surface of the character's skin, and output a mesh manifold of the character's skin, possibly depicting an expression corresponding to the input strain vector.

Using the above methods and apparatus, an animator can specify a facial expression in the domain of muscle semantics, which can simplify an animation process compared to limiting the animator to making combinations of recorded expressions as blends of the scanned facial shapes. In the general case, a length of a muscle is determined from its strain value and its rest length. Allowed strain values might be constrained by the manifold so that strain values remain within plausible boundaries. For a given scan of an expression on an actor's face, a muscle model for that live actor, and a skull model for that live actor, an AI process can determine a likely strain vector that, when input to an animation generation system, would result in an expression largely matching the scanned expression. Knowing the strain values, the animation generation system can provide those as the domain in which the animator would modify expressions. After training an AI system using dynamic scans of an actor's face as the ground truth for training, the muscle model can be derived that would allow for the simulation of other expressions that were not captured.

In some instances, there might be more than one hundred muscles represented in the muscle model and the AI system that extracts a strain vector and a control vector from dynamic scans of the actor might be able to provide approximate solutions to match expressions. The control vector might include other values besides jaw and eye positions.

As explained herein, an animation process might simulate facial expressions through the use of a unique combination of hi-resolution scans of a human face, simulated muscles, facial control vectors, and constraints to generate unlimited facial expressions. In one embodiment, an AI system is employed to receive facial control vectors generated from a series of muscle strain inputs and process those vectors relative to a facial expression manifold configured to constrain facial expressions of the simulation to plausible expressions. Simulation need not be limited to simulating facial expressions that correspond to a real-world physical action, but more generally might be the generation of facial expressions informed by expressions made and recorded.

Separate AI systems might be used to train and derive the muscle model and to train and derive the manifold. In some embodiments, in order to hit a target expression (and corresponding skin shape), the muscle model might be differentiable. An AI system might include a variational autoencoder (VAE).

The AI uses muscle control vectors, instead of blend shape weights or other approaches, and can then specify strains on those muscle control vectors, which would in turn specify lengths of contractions of the muscles in a simulator. Each muscle scan be represented by a curve, which might have a length that is a function of the strain. A muscle vector might comprise strains that affect a mesh representing the skin of a character. The muscles might include a rest length and attachment point, and together represent a muscle geometry. Using the combination of the input scans, the strains, the muscle control vectors, and manifold constraints, an animation system can output plausible facial expressions.

A renderer 126 can process the facial surface, perhaps mapping it to a character model from a character model store 128, such as a non-human character played by Actor A, to form animated output that might be stored in animated output store 130.

Figure 1B:
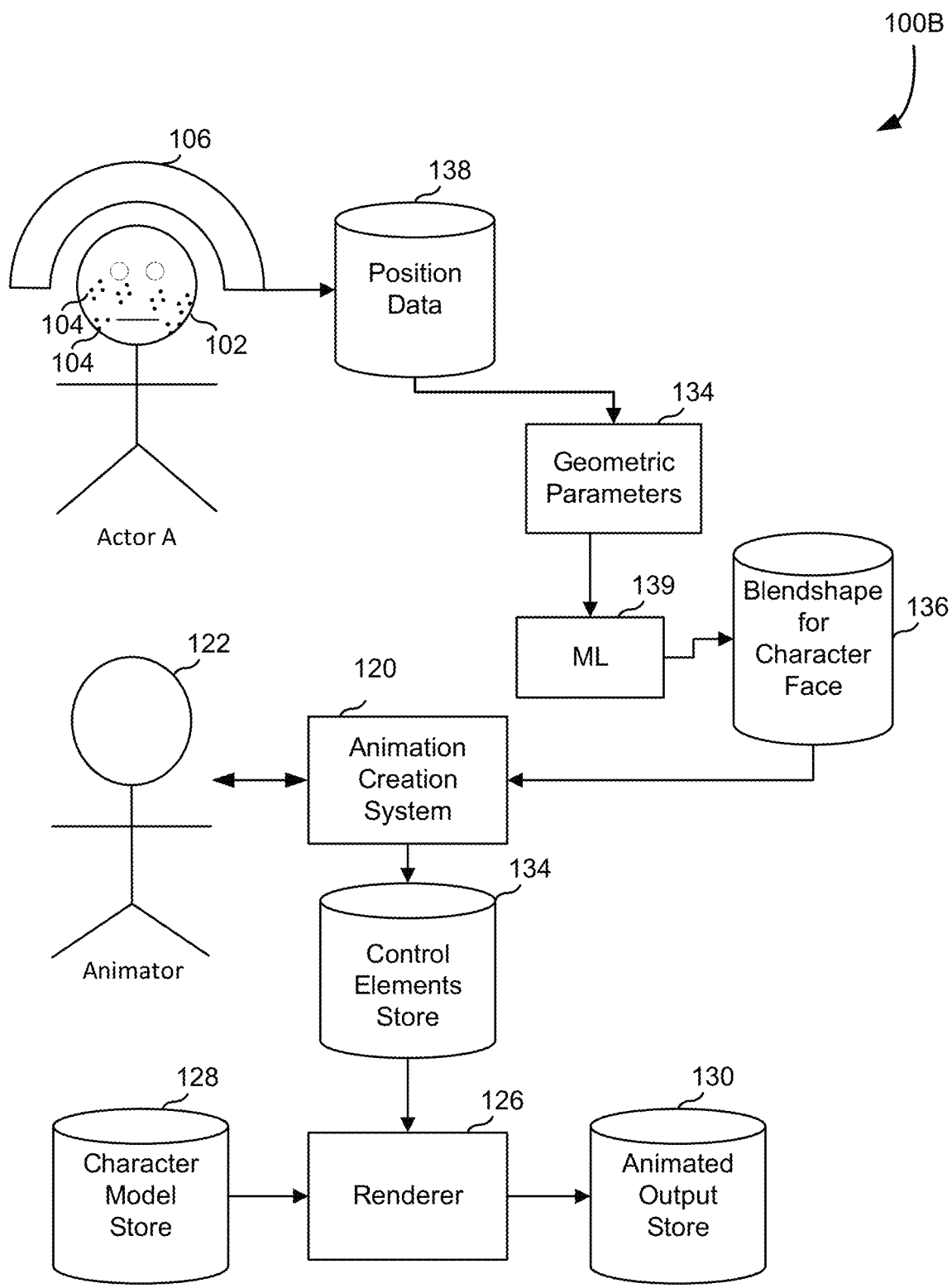
FIG. 1B illustrates an alternative embodiment of animation pipeline 100b that might be used to render animated content showing animation of a character based a rig that is generated based on geometric characteristics of facial poses, according to embodiments described herein.

FIG. 1B illustrates an alternative embodiment of animation pipeline 100b that might be used to render animated content showing animation of a character based a rig that is generated based on geometric characteristics of facial poses, according to embodiments described herein. In one embodiment, the markers 104 placed on the face of the live actor 102 may be used to collect position data of the markers 104. The markers 104 include any combination of a physical marker that is attached on the face of the human actor, a painted marker on the face of the human actor, a virtual marker that is projected on to the face of the human actor. For example, the markers 104 may take a form of an array of dotted pattern placed on the face of the human actor.

For example, when the live actor 102 performs a facial pose of "smile," the position parameters of the markers 104 are stored at the position data store 138. When the live actor 102 evolves from "smile" to "neutral," the time-varying position parameters of the markers 104 during this time period are also stored at the position data store 138.

The geometric parameters 134 from the position data 138, e.g., labeled with the corresponding facial pose, are then input to the machine learning system 139 to transform into a blendshape of geometric parameters 126 representing position data on the animated character face. For example, the blendshape of geometric parameters may take a form of a set of position offset vectors, which may be added (optionally scaled by an animated weight factor) to the skin of a basic (neutral) pose. The machine learning system 139, e.g., a deep learning network, or other types of error correcting models, is configured to learn a mapping relationship between the position of the markers 104 on the face of the live actor 102 and the control values and/or positions of the controllable elements for the character face.

For example, an error correcting system may be used to compute an error metric associated with the output from module 139. The error metric is then minimized to update the model parameters.

Thus, the blendshape for the character face 126 may be used to input to an animation creation system 120, which generates the control elements store 134 to create a manifold for animation. The rest of the animation process may be similar to that described in FIG. 1A. In this way, the animation system 100b is conducted based on geometric characteristics of actor face without generating a mesh of a facial rig to reduce computational complexity.

Figure 2A:
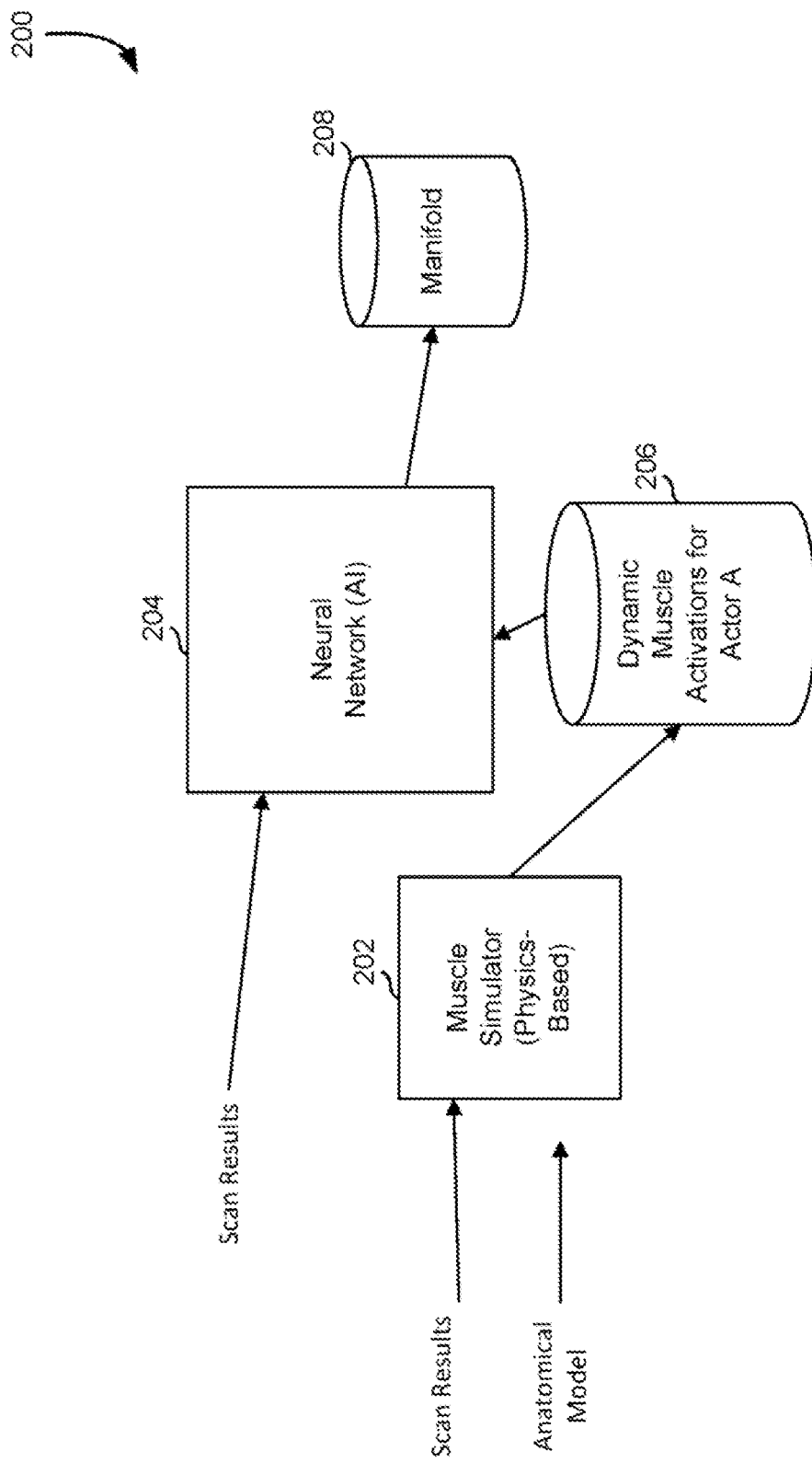
FIG. 2A illustrates an example neural network system in which scan results are provided to a muscle simulator and a neural network and an anatomical model to the muscle simulator, according to embodiments described herein.

FIG. 2A illustrates an example neural network system 200 in which scan results are provided to a muscle simulator 202 and a neural network 204 and an anatomical model to the muscle simulator 202. An output of the muscle simulator 202 is dynamic muscle activations for Actor A, which in turn are provided to neural network 204. Neural network 204 then outputs a manifold to manifold storage 208.

Figure 2B:
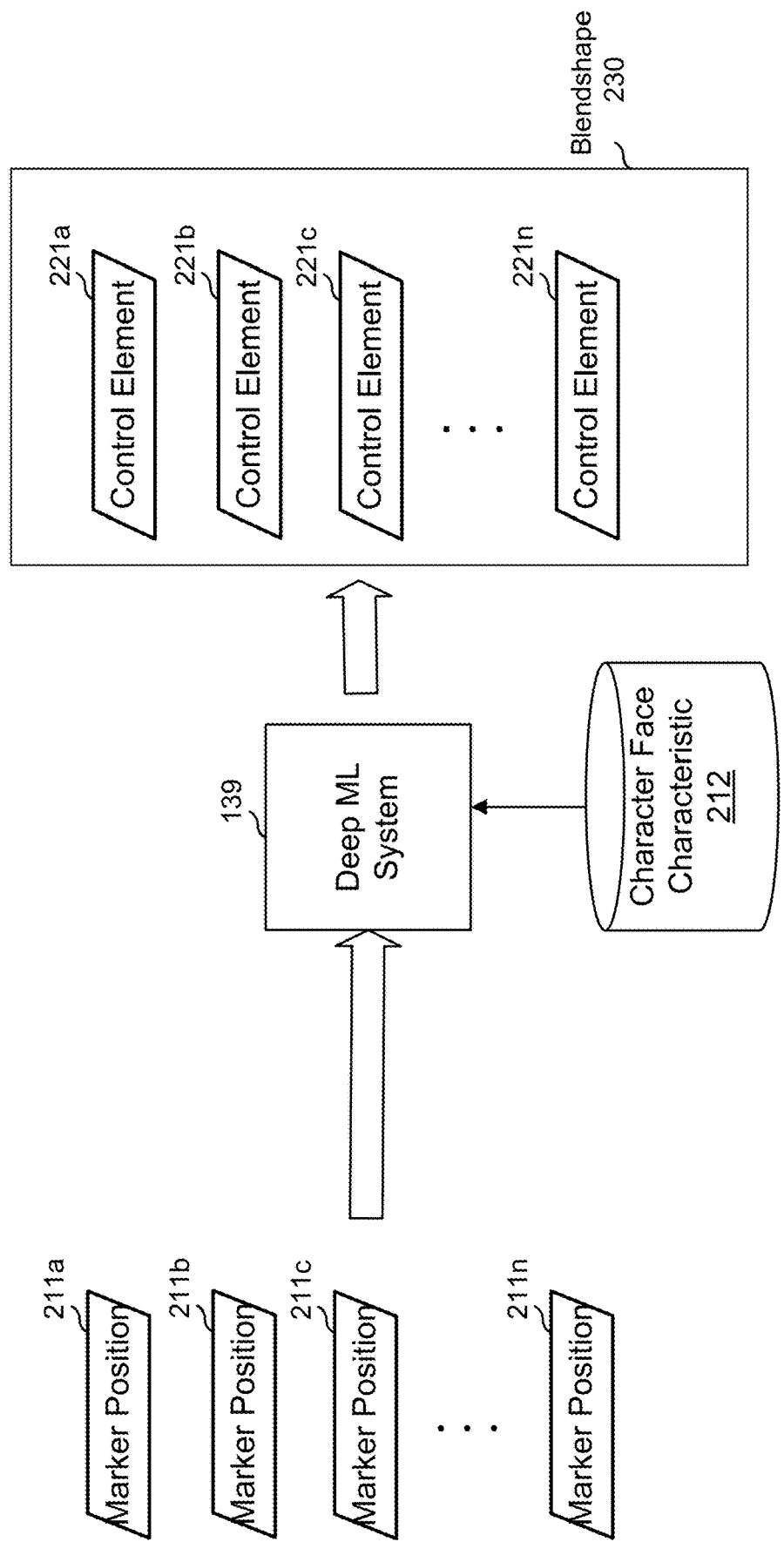
FIG. 2B provides an example block diagram illustrating an alternative embodiment of a deep machine learning system in which marker position data is learnt to be transformed to control elements in a mesh applicable to the character face of an artificial character, according to embodiments described herein.

FIG. 2B provides an example block diagram illustrating an alternative embodiment of a deep machine learning system 139 in which marker position data is learnt to be transformed to control elements in a mesh applicable to the character face of an artificial character, according to embodiments described herein. In one embodiment, position data, e.g., marker positions 211a-n may be input to the deep machine learning system 139. For example, the marker position data 211a may take a form of the geometric coordinates of the position of the respective marker, e.g., (X, Y, Z).

The machine learning system 139 may further receive characteristic data of the character face 212 (e.g., a set of sampled grids on the skin surface of the character face, etc.) and generate a blendshape of control elements 230 applicable for a character face of an artificial character. Specifically, the blendshape 230 is comprised of a set of controllable elements 221a-n, each corresponding to a controllable value. The controllable value may dictate the position of the corresponding controllable element on the character face, and thus changes to the controllable values may cause a deformation of the character face, resulting in a corresponding facial pose. Therefore, the machine learning system 139 may be trained to transform the marker positions 211a-n to a set of controllable element values 221a-n in the blendshape 230 to cause the mesh 230 to generate a desired facial pose on the character face.

Thus, the machine learning system 139 is configured to learn a mapping relationship between the position of the markers on the face of the live actor and the control values and/or positions of the controllable elements in the mesh for the character face. For example, the machine learning system 139 may receive a training dataset of position data of the markers placed on the face of the live actor, and a set of corresponding ground-truth control element values that generate the same facial pose on the character face as that performed by the live actor.

The position data in the training dataset, instead of the actual (X, Y, Z) coordinates of the markers, may include marker features, such as a pairwise distance, a specific angle of the marker, and/or the like. For example, an example marker feature may include the angle between the upper and lower eye lids (which may indicate whether or how much the eyes are "closed" or "open"). For another example, an example marker feature may include a distance between a chin marker and a nose marker compared to the baseline distance in the neural facial pose, which may indicate whether the jaw or how much the haw is "closed" or "open."

The training dataset may includes a time series of time-varying positions of the markers, e.g., from those corresponding to "neutral" to "smile," and on to another facial pose, and/or the like.

The deep learning system 139 may then generate predicted control element values in response to the input position data of the markers, and compare the predicted control element values with the ground-truth control element values to compute a training objective. The training objective is minimized to update the machine learning system 139.

In some embodiments, the training objective may further incorporate information relating to characteristics specific to an actor. For example, the deep learning system 139 may predict a preferred expression characteristic in addition to the control values transformed from the marker positions. The predicted preferred expression characteristic and the actual ground-truth expression may be compared to learn the preference of marker position inferred expression, e.g., even for the same marker positions around the mouth contour, one actor may prefer to have the lips closed, and another actor may prefer to have the lips open. Such information may supplement the marker position data to be transformed to animate the character face.

In one embodiment, the set of control elements 221a-n may be distributed at different areas on the character face. Thus, the deep learning system 139 may generate control values progressively. For example, the deep learning system 130 may generate control values for a first set of control elements at the eye region of the character face, and then generate control values for a second set of control elements at the jaw region of the character face that has the eye area solved with the first set of control values, and so on. In this way, the progressive solving process of the character face may allow progressive adjustment of the control values region by region and thus improve accuracy of the facial solving process.

FIG. 3A illustrates an example of a data structure that might represent a muscle model. In that model, each muscle might be defined by a bone attachment point, a skin attachment point, and a muscle volume. In animation, as the strain on a muscle changes, the volume of the muscle might change shape, and the distance between the bone attachment point and the skin attachment point might change, thus creating expressions. Additional elements might be included in a control vector that are for other animation variables.

FIG. 3B illustrates an example of a data structure that might represent the position data 211a-n as show in FIG. 2B, according to embodiments described herein. For example, the control values 350 may each be associated with a controllable element index, and the 3D position coordinates. In particular, the control values 350 may be progressively assigned to the controllable elements per different subregions on the face, e.g., eye area, jaw area, cheek area, and/or the like.

Figure 4:
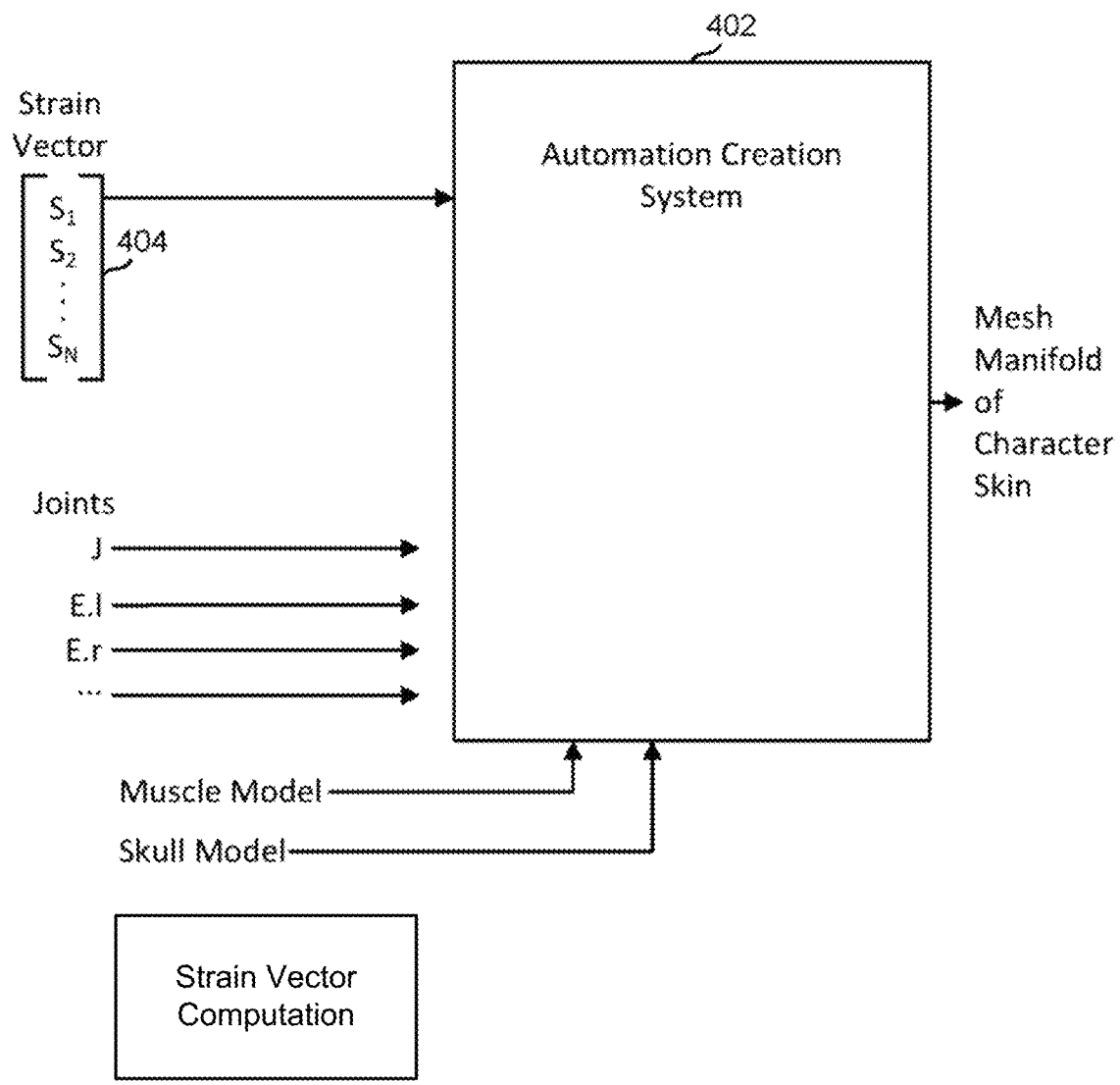
FIG. 4 illustrates inputs and outputs of an animation creation system, in an embodiment.

FIG. 4 illustrates inputs and outputs of an animation creation system 402. Inputs might include an input strain vector 404, indicative a strain values for some or all of the muscles in the muscle model, and values for the other animation variables, such as a scalar value for a jaw angle, two 2D vectors corresponding to rotations of the eyes, etc. Along with the muscle model, which describes where the muscles are attached and their volume, and a skull model representing an actor's skull shape and contour, and a control vector for other non-muscle animation variables, the animation creation system 402 can determine the volumes occupied by the muscles, and thus the surface of the character's skin, and output a mesh manifold of the character's skin, possibly depicting an expression corresponding to the input strain vector 404.

Figure 5:
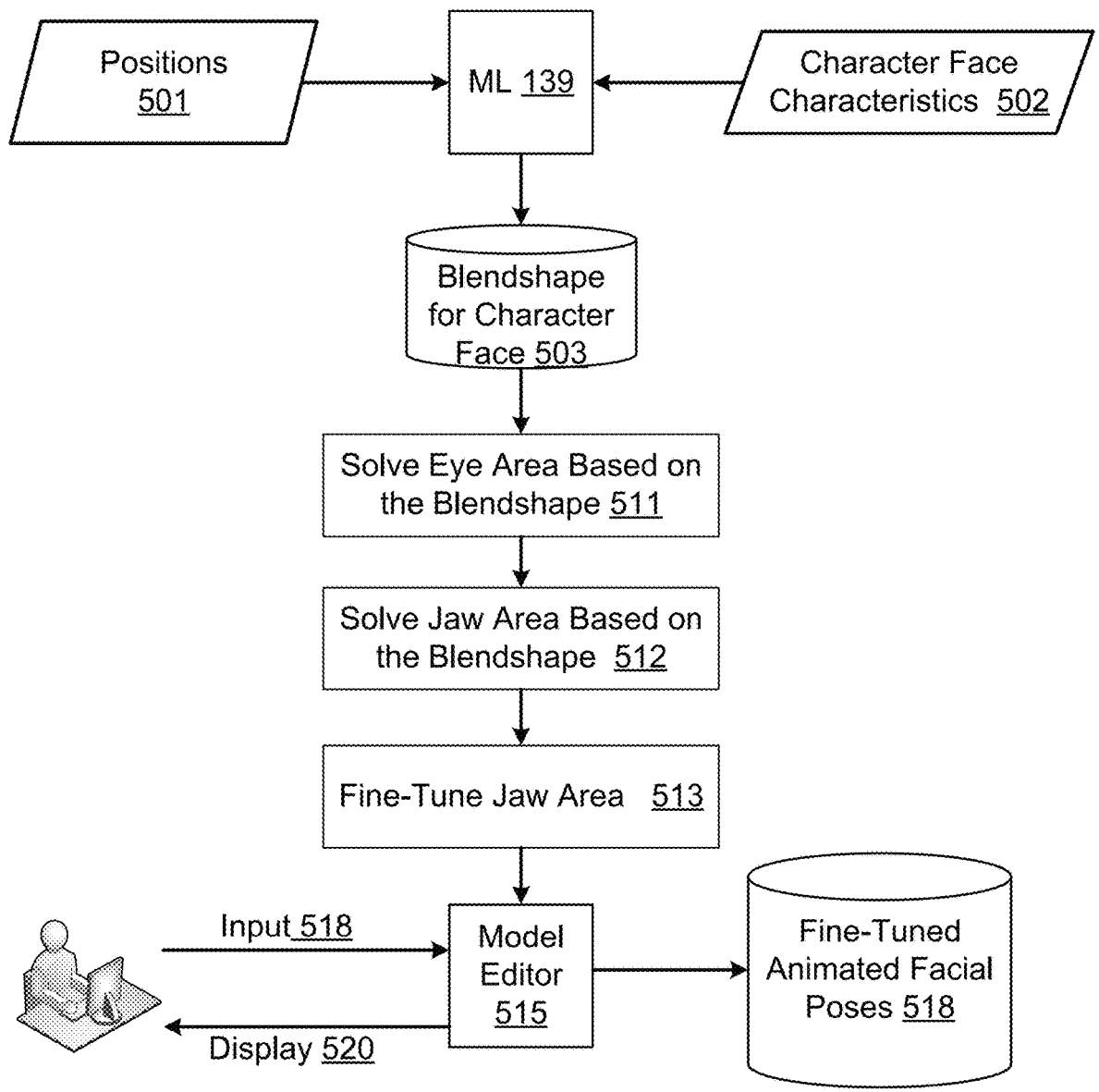
FIG. 5 provides an example diagram illustrating an example work flow of generating a mesh usable for representing an animated facial pose applicable in an animation system to an artificial character, according to embodiments described herein.

FIG. 5 provides an example diagram illustrating an example workflow of generating a blendshape usable for representing an animated facial pose applicable in an animation system to an artificial character, according to embodiments described herein. A machine learning system 139 may receive a set of geometric parameters corresponding to positions 501 of a plurality of markers placed on a face of a human actor. The positions 501 of the plurality of markers represents a facial pose performed by the human actor, e.g., "smile," "neutral," "angry," and/or the like. The machine learning system 139 may also receive character face characteristics data 502 that depict the facial features of the character face.

The machine learning system 139 has been trained to learn a transformation from geometric parameters labelled with a certain facial pose performed by the human actor to a corresponding animated facial pose of the artificial character. The system 139 may then construct a blendshape 503 comprising a set of control elements applicable to a character face of the artificial character based, at least in part, on a deep learning network input representing the set of geometric parameters from the positions 501. The blendshape 503 includes a set of controllable elements that are mapped from the plurality of markers on the face of the human actor. Position changes of one or more control elements may cause a change from a first animated facial pose to a second animated facial pose on the character face. For example, the three-dimensional blendshape 503 of the facial rig is constructed by determining, via the deep learning network 139, a plurality of positions of the set of the controllable elements on the character face. The controllable elements include one or more control handles that is editable by an animation artist.

At process 511-513, the blendshape 503 may be applied to the character face to generate an animated facial pose. Specifically, at process 511, a first subset of controllable elements corresponding to a first part of the facial rig is applied to the character face. For example, the control activation values corresponding to eye area controllable elements are generated by the machine learning system 130, and applied to the mesh.

At process 512, a second subset of controllable elements corresponding to a second part of the facial rig are applied to a first resulting animated facial pose of the character face from applying the first subset of controllable elements. For example, after "solving" the eye area based on the control elements at process 511 (e.g., to generate and apply control values of eye area to the set of controllable elements), control activation values corresponding to jaw area controllable elements are generated by the machine learning system 130, and applied to the blendshape that has already been populated with eye area controllable values.

At process 513, a second resulting animated facial pose of the character face from applying the second subset of controllable elements may be fine-tuned with a user input adjusting the first subset of controllable elements or the second subset of controllable elements. For example, a model editor user interface 515 may be used to receive a user input 518 of modification that adjusts the generated animation, and provide the adjusted animated facial pose via a display 520. The received user input may include a modification to the set of controllable elements, e.g., a change to a position of at least one controllable elements.

The fine-tuning may be performed in real time and may be stored at the fine-tuned animated facial poses 518.

Figure 6:
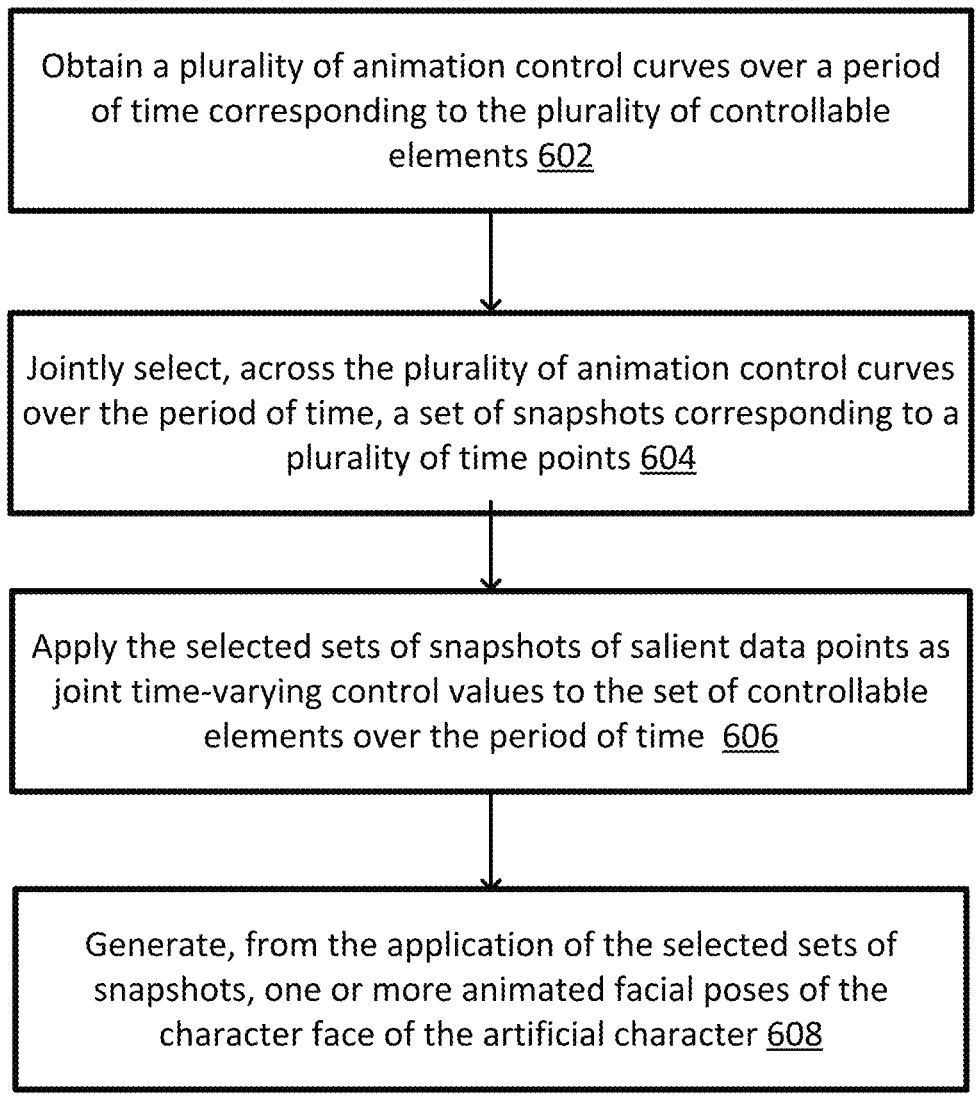
FIG. 6 provides an example diagram illustrating an example work flow of generating an animated facial pose on a character face of an artificial character using a mesh usable for representing the animated facial pose applicable in an animation system to the artificial character, according to embodiments described herein.

FIG. 6 provides an example diagram illustrating an example workflow of generating an animated facial pose on a character face of an artificial character using salient points on the animation control curves to improve computational efficiency, according to embodiments described herein. In one embodiment, the animated character face may be generated via a set of animation control curves of time-varying control values. For example, as illustrated in FIGS. 1B and 2B, the blendshape includes a set of controllable elements whose value changes cause a change in an animated facial pose on the character face of the artificial character. In another embodiment, the animated facial pose on the character face may be controlled by the blendshape of control values representing positions on the animated character face transformed from geometric parameters of markers on a human face representing one or more facial poses performed by the human actor, similar to the process as shown in FIGS. 1B and 2B. Each set of the positions of the plurality of markers represents a respective facial pose performed by the human actor.

In another embodiment, the mesh is generated from the data relating to one or more facial poses performed by the human actor includes a plurality of facial scans obtained from the face of the human actor, similar to the processes shown in FIGS. 1A and 2A. Each facial scan includes a set of muscle strain values and a corresponding set of skin surface values that correspond to a respective facial pose.

At process 602, a plurality of animation control curves are obtained over a period of time corresponding to the plurality of controllable elements contained in the mesh. Each animation control curve from the plurality of animation control curves takes a form of a time series of muscle strain values evolving over the time period. For example, the animation control curve may take a form of a time series of muscle strain values evolving over the time period (corresponding to the animation system shown in FIG. 1A), or a time series of geometric parameter depicting a time-varying position of a respective controllable element over the time period (corresponding to the animation system shown in FIG. 1B).

At process 604, a set of "snapshots" corresponding to a plurality of time points may be jointly selected, across the plurality of animation control curves over the period of time.

Each snapshot represents a plurality of salient data points on the plurality of animation control curves at a particular time point. In this way, a set of salient data points may be jointly selected from the plurality of animation control curves.

For example, the snapshots of salient data points may be selected from a user input indicating the density of the salient data points on each animation control curve. For another example, the set of snapshots of selected respective set of salient data points may be selected according to a user input indicating one or more particular data points on a particular animation control curve via a user interface.

In one implementation, the snapshots of salient data points may be automatically selected via an algorithm or computational procedure. For another example, the salient data points may be computed by sampling a discrete-time series of data points from the respective animation control curve, and computing a salient point on the respective animation control curve to approximate a cluster of adjacent data points from the discrete-time series of data points. In one implementation, the salient point is computed as a data point on the respective animation control curve corresponding to an average time instance among the cluster of adjacent data points. In another implementation, the salient point is computed as a data point at which a first order derivative of the respective animation control curve changes a sign among a time range spanned by the cluster of adjacent data points. Further, a user input may be received to fine-tune the computed center point on the respective animation control curve.

In one embodiment, a machine learning system may be adopted to jointly select the snapshots of salient data points from the plurality of animation control curves. For example, the machine learning system may be trained to minimize a difference (e.g., a root mean square difference, etc.) between an animated facial pose controlled by original animation control curves and an animated facial pose controlled by sampled salient data points. In this way, the machine learning system may learn to select the salient data points to approximate the performance of the original animation control curves.

At process 606, the selected sets of salient data points are applied as time-varying control values for the set of controllable elements over the period of time.

At process 608, one or more animated facial poses of the character face of the artificial character are generated from the application of the selected sets of snapshots of salient data points.

Figure 7A:
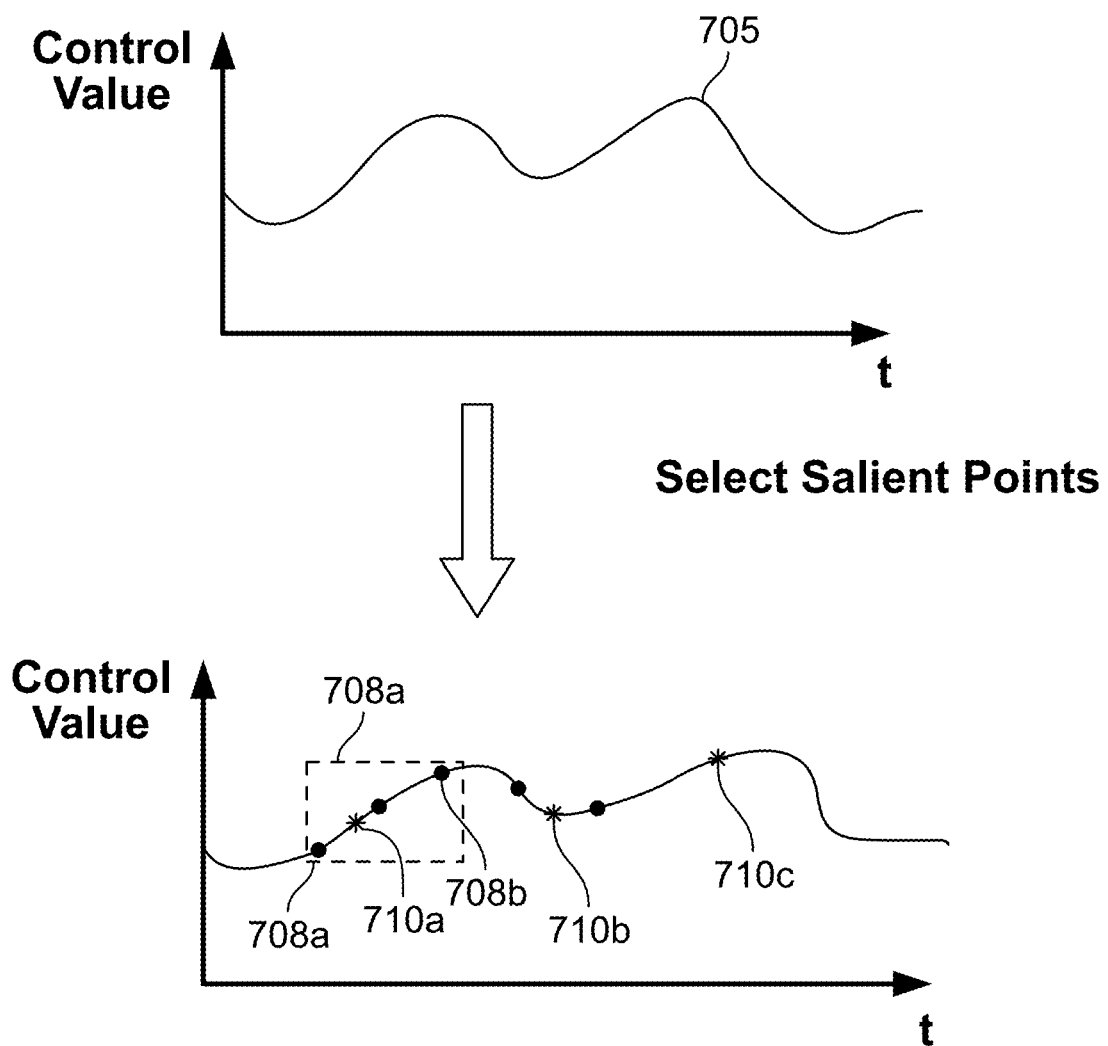
FIGS. 7A-7C provide example plots illustrating selecting salient points from animation control curves, according to embodiments described herein.
Figure 7B:
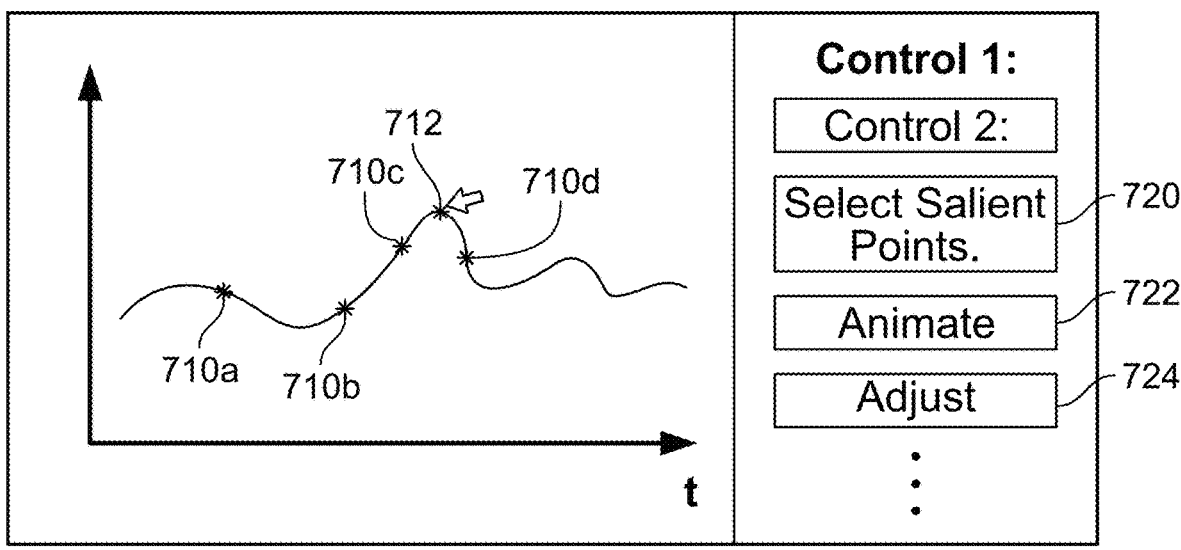
Figure 7C:
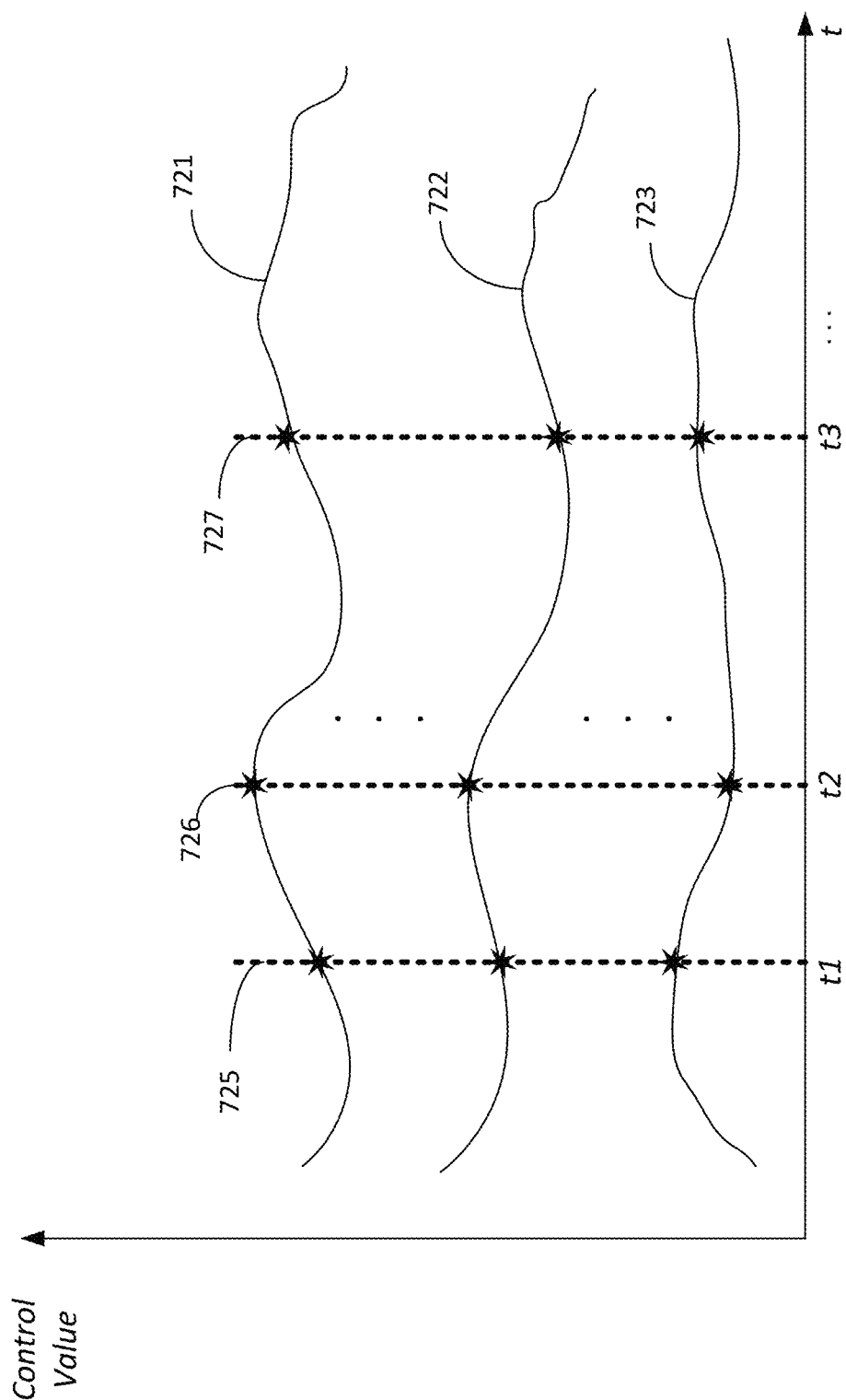

FIGS. 7A-7C provide example plots illustrating selecting salient points from animation control curves, according to embodiments described herein. In FIG. 7A, for the control value curve 705, various salient points can be selected. For example, the salient points may be evenly sampled from the curve 705, e.g., see 708a-c. For another example, the salient points may be selected by a user input at 710a, 710b, 710c. For another example, the salient point may be computed, e.g., salient point 710a is computed as an approximation of the cluster of points 708a, 708b and 708c.

In FIG. 7B, salient points may be selected by prioritizing data points at a "steep" segment on the animation curve, e.g., 710c, 712, 710d, as these data points may represent control values for more "extreme" variants in facial poses. A user interface may be presented to an animator for select or fine-tune the salient points 720, generate an animation 722 and/or adjust the animation 724.

For example, given an animation control value curve, depending on the shape or the curvature (e.g., first/second order derivative) of the curve, a count of salient points may be decided for sampling, e.g., the more "turns" the curve might have, indicating more drastic change in the animated facial poses, more salient points may be needed. An algorithm may then be applied to choose the salient points by prioritizing selecting data points that depict the "turning points" on the animation control curve (e.g., when the first order derivative changes sign, etc.), and may select relatively fewer data points at a flatter segment on the curve.

In one embodiment, the selection of the salient point may be optimized by minimizing a mean square error between the original animation curve and an extrapolated curve connecting the selected salient points.

Therefore, a process to automatically compute or select salient points may include: computing at a plurality of sample points, the first/second order derivative of the animation curve, and selecting a subset of salient points at which the first order derivative changes signs, or the second order derivative is close to zero. The system may then compute a mean square error between the animation curve and the selected set of salient points. The process may be repeated for a different subset of salient points to minimize the mean square error and thus fine-tune the selection of salient points.

FIG. 7C illustrates an example of jointly selecting snapshots of salient data points across different animation control curves. In FIG. 7C, the set of control elements may be controlled by a set of control animation curves represented by 721, 722, 723 (or additional animation curves). The selected snapshots 725, 726 and 272 at various time points may contain various salient data points represented by the star markers at the intersections of the snapshots of each animation control curve 721, 722 and 723. Thus, the salient data points may be used to replace the original control curves 721, 722 and 723.

Figure 8:
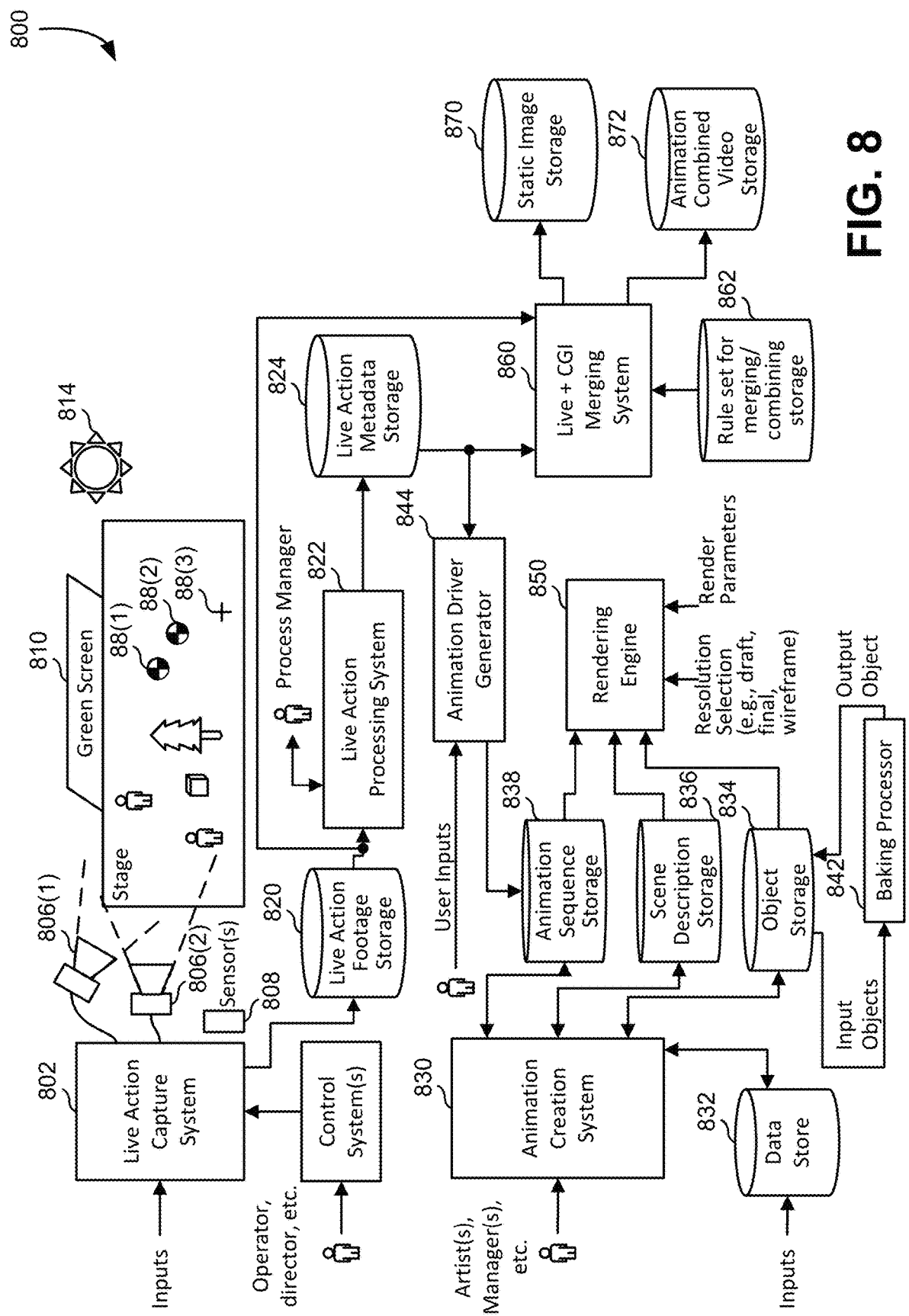
FIG. 8 illustrates an example visual content generation system as might be used to generate imagery in the form of still images and/or video sequences of images, according to various embodiments.

The visual content generation system 800 of FIG. 8 can be is configured to generate and process muscle models, facial rigs, and animator user interfaces described in relation to FIGS. 1-11 and may be implemented by software executing on one or more computer systems (e.g., each like a computer system 1300 illustrated in FIG. 13).

For example, FIG. 8 illustrates the example visual content generation system 800 as might be used to generate imagery in the form of still images and/or video sequences of images. The visual content generation system 800 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 800 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 800 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 880 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 8, a live action capture system 802 captures a live scene that plays out on a stage 804. The live action capture system 802 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 806(1) and 806(2) capture the scene, while in some systems, there might be other sensor(s) 808 that capture information from the live scene (e.g., infrared cameras, infrared sensors, motion capture ("mo-cap") detectors, etc.). On the stage 804, there might be human actors, animal actors, inanimate objects, background objects, and possibly an object such as a green screen 810 that is designed to be captured in a live scene recording in such a way that it is easily overlaid with computer-generated imagery. The stage 804 might also contain objects that serve as fiducials, such as fiducials 812(1)-(3), that might be used post-capture to determine where an object was during capture. A live action scene might be illuminated by one or more lights, such as an overhead light 814.

During or following the capture of a live action scene, the live action capture system 802 might output live action footage to a live action footage storage 820. A live action processing system 822 might process live action footage to generate data about that live action footage and store that data into a live action metadata storage 824. The live action processing system 822 might include computer processing capabilities, image processing capabilities, one or more processors, program code storage for storing program instructions executable by the one or more processors, as well as user input devices and user output devices, not all of which are shown. The live action processing system 822 might process live action footage to determine boundaries of objects in a frame or multiple frames, determine locations of objects in a live action scene, where a camera was relative to some action, distances between moving objects and fiducials, etc. Where elements are sensored or detected, the metadata might include location, color, and intensity of the overhead light 814, as that might be useful in post-processing to match computer-generated lighting on objects that are computer-generated and overlaid on the live action footage. The live action processing system 822 might operate autonomously, perhaps based on predetermined program instructions, to generate and output the live action metadata upon receiving and inputting the live action footage. The live action footage can be camera-captured data as well as data from other sensors.

An animation creation system 830 is another part of the visual content generation system 800. The animation creation system 830 might include computer processing capabilities, image processing capabilities, one or more processors, program code storage for storing program instructions executable by the one or more processors, as well as user input devices and user output devices, not all of which are shown. The animation creation system 830 might be used by animation artists, managers, and others to specify details, perhaps programmatically and/or interactively, of imagery to be generated. From user input and data from a database or other data source, indicated as a data store 832, the animation creation system 830 might generate and output data representing objects (e.g., a horse, a human, a ball, a teapot, a cloud, a light source, a texture, etc.) to an object storage 834, generate and output data representing a scene into a scene description storage 836, and/or generate and output data representing animation sequences to an animation sequence storage 838.

Scene data might indicate locations of objects and other visual elements, values of their parameters, lighting, camera location, camera view plane, and other details that a rendering engine 850 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 830 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 834 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 832 might be used to drive object presentation. For example, if an artist is creating an animation of a spaceship passing over the surface of the Earth, instead of manually drawing or specifying a coastline, the artist might specify that the animation creation system 830 is to read data from the data store 832 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 844 might read in live action metadata, such as data representing movements and positions of body parts of a live actor during a live action scene, and generate corresponding animation parameters to be stored in the animation sequence storage 838 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 822. The animation driver generator 844 might convert that movement data into specifications of how joints of an articulated CGI character are to move over time.

A rendering engine 850 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 850 might include computer processing capabilities, image processing capabilities, one or more processors, program code storage for storing program instructions executable by the one or more processors, as well as user input devices and user output devices, not all of which are shown.

The visual content generation system 800 can also include a merging system 860 that merges live footage with animated content. The live footage might be obtained and input by reading from the live action footage storage 820 to obtain live action footage, by reading from the live action metadata storage 824 to obtain details such as presumed segmentation in captured images segmenting objects in a live action scene from their background (perhaps aided by the fact that the green screen 810 was part of the live action scene), and by obtaining CGI imagery from the rendering engine 850.

A merging system 860 might also read data from a rulesets for merging/combining storage 862. A very simple example of a rule in a ruleset might be "obtain a full image including a two-dimensional pixel array from live footage, obtain a full image including a two-dimensional pixel array from the rendering engine 850, and output an image where each pixel is a corresponding pixel from the rendering engine 850 when the corresponding pixel in the live footage is a specific color of green, otherwise output a pixel value from the corresponding pixel in the live footage."

The merging system 860 might include computer processing capabilities, image processing capabilities, one or more processors, program code storage for storing program instructions executable by the one or more processors, as well as user input devices and user output devices, not all of which are shown. The merging system 860 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 860, such as modifying boundaries of segmented objects, inserting blurs to smooth out imperfections, or adding other effects. Based on its inputs, the merging system 860 can output an image to be stored in a static image storage 870 and/or a sequence of images in the form of video to be stored in an animated/combined video storage 872.

Thus, as described, the visual content generation system 800 can be used to generate video that combines live action with computer-generated animation using various components and tools, some of which are described in more detail herein. While the visual content generation system 800 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

For example, FIG. 9 is a block diagram that illustrates a computer system 900 upon which the computer systems described herein and/or the visual content generation system 800 (see FIG. 8) may be implemented. The computer system 900 includes a bus 902 or other communication mechanism for communicating information, and a processor 904 coupled with the bus 902 for processing information. The processor 904 may be, for example, a general purpose microprocessor.

The computer system 900 also includes a main memory 906, such as a random access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. Such instructions, when stored in non-transitory storage media accessible to the processor 904, render the computer system 900 into a special-purpose machine that is customized to perform the operations specified in the instructions.

The computer system 900 further includes a read only memory (ROM) 908 or other static storage device coupled to the bus 902 for storing static information and instructions for the processor 904. A storage device 910, such as a magnetic disk or optical disk, is provided and coupled to the bus 902 for storing information and instructions.

The computer system 900 may be coupled via the bus 902 to a display 912, such as a computer monitor, for displaying information to a computer user. An input device 914, including alphanumeric and other keys, is coupled to the bus 902 for communicating information and command selections to the processor 904. Another type of user input device is a cursor control 916, such as a mouse, a trackball, or cursor direction keys for communicating direction information and command selections to the processor 904 and for controlling cursor movement on the display 912. This input device typically has two degrees of freedom in two axes, a first axis (e.g., x) and a second axis (e.g., y), that allows the device to specify positions in a plane.

The computer system 900 may implement the techniques described herein using customized hard-wired logic, one or more ASICs or FPGAs, firmware and/or program logic which in combination with the computer system causes or programs the computer system 900 to be a special-purpose machine. According to one embodiment, the techniques herein are performed by the computer system 900 in response to the processor 904 executing one or more sequences of one or more instructions contained in the main memory 906. Such instructions may be read into the main memory 906 from another storage medium, such as the storage device 910. Execution of the sequences of instructions contained in the main memory 906 causes the processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 910. Volatile media includes dynamic memory, such as the main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 902. Transmission media can also take the form of acoustic or light waves, such as those generated during radio-wave and infra-red data communications.

Various forms of media may be involved in carrying one or more sequences of one or more instructions to the processor 904 for execution. For example, the instructions may initially be carried on a magnetic disk or solid state drive of a remote computer. The remote computer can load the instructions into its dynamic memory and send the instructions over a network connection. A modem or network interface local to the computer system 900 can receive the data. The bus 902 carries the data to the main memory 906, from which the processor 904 retrieves and executes the instructions. The instructions received by the main memory 906 may optionally be stored on the storage device 910 either before or after execution by the processor 904.

The computer system 900 also includes a communication interface 918 coupled to the bus 902. The communication interface 918 provides a two-way data communication coupling to a network link 920 that is connected to a local network 922. For example, the communication interface 918 may be an integrated services digital network (ISDN) card, cable modem, satellite modem, or a modem to provide a data communication connection to a corresponding type of telephone line. Wireless links may also be implemented. In any such implementation, the communication interface 918 sends and receives electrical, electromagnetic, or optical signals that carry digital data streams representing various types of information.

The network link 920 typically provides data communication through one or more networks to other data devices. For example, the network link 920 may provide a connection through the local network 922 to a host computer 924 or to data equipment operated by an Internet Service Provider (ISP) 926. The ISP 926 in turn provides data communication services through the world wide packet data communication network now commonly referred to as the "Internet" 928. The local network 922 and Internet 928 both use electrical, electromagnetic, or optical signals that carry digital data streams. The signals through the various networks and the signals on the network link 920 and through the communication interface 918, which carry the digital data to and from the computer system 900, are example forms of transmission media.

The computer system 900 can send messages and receive data, including program code, through the network(s), the network link 920, and communication interface 918. In the Internet example, a server 930 might transmit a requested code for an application program through the Internet 928, ISP 926, local network 922, and communication interface 918. The received code may be executed by the processor 904 as it is received, and/or stored in the storage device 910, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for generating a first data structure usable for representing an animated facial pose applicable in an animation system to an artificial character, the method comprising:
    receiving a first set of geometric parameters corresponding to a first set of markers, wherein the first set of geometric parameters represent respective positions of the first set of markers on a face of a human actor, and wherein the first set of geometric parameters correspond to a first facial pose performed by the human actor;
    transforming, by a learning system that has been trained to learn a transformation from characteristics of the face of the human actor performing a certain facial pose to characteristics of an animated character face performing the same certain facial pose, the first set of geometric parameters into a blendshape of geometric parameters representing positions of a set of controllable elements that are distributed on the animated character face,
    wherein geometric position changes of the set of control elements cause a pose change from a first animated facial pose to a second animated facial pose on the animated character face;
    generating the first animated facial pose on the animated character face by:
        a) applying a first subset of control values from the blendshape of geometric parameters to a first subset of the set of controllable elements to generate a first region on the animated character face;
        b) applying a second subset of control values from the blendshape of geometric parameters to a second subset of the set of controllable elements after the first region is generated to subsequently generate a second region on the animated character face; and
        c) fine-tuning a resulting animated facial pose constructed by the first region and the second region on the animated character face with a user input modifying the first subset of control values or the second subset of control values; and
    generating one or more animated facial poses on the animated character face resulting from varying control values for the set of controllable elements.

2. The computer-implemented method of claim 1, wherein the first set of markers includes any combination of a natural skin structure, a physical marker that is attached on the face of the human actor, a painted marker on the face of the human actor, a virtual marker that is projected on to the face of the human actor.

3. The computer-implemented method of claim 1, further comprising:
    obtaining a time series of observations of the positions of the first set of markers;
    training the deep learning network by reconstructing via the deep learning network one or more facial poses on the face of the human actor using the time series of observations of the positions; and
    generating, by the trained deep learning network, the one or more animated facial poses on the animated character faces.

4. The computer-implemented method of claim 1, wherein the set of controllable elements includes one or more control handles that is editable by an animation artist.

5. The computer-implemented method of claim 1, wherein the one or more animated facial poses on the animated character face are generated to reduce employing a mesh, or portion thereof, of a facial rig based on the face of the human actor to reduce computational complexity.

6. The computer-implemented method of claim 1, wherein the applying the first subset of control values to the first subset comprises:
    determining the first subset of control values from the blendshape of geometric parameters, wherein the first subset of control values reflect first geometric and positional characteristics of an eye area on the character face.

7. The computer-implemented method of claim 1, wherein the applying the second subset of control values to the second subset of controllable elements comprises:
    determining the second subset of control values from the blendshape of geometric parameters, wherein the second subset of control values reflect second geometric and positional characteristics of a jaw area on the character face.

8. The computer-implemented method of claim 1, further comprising:
    receiving a training dataset of a plurality of sets of positions corresponding to the first set of markers, each set of positions being labeled with a corresponding set of blendshape of geometric parameters on the animated character face;
    generating, via the deep learning network, a predicted blendshape of geometric parameters in response to an input set of positions corresponding to the first set of markers;
    computing a training objective by comparing the predicted blendshape of geometric parameters with a set of ground-truth geometric parameters forming a corresponding facial pose on the animated character face; and
    updating the deep learning network based on the computed training objective.

9. The computer-implemented method of claim 8, wherein the training dataset includes at least set of positions that correspond to a neutral facial pose performed by the human actor.

10. The computer-implemented method of claim 1, further comprising:
    receiving, via a user interface, a modification to control values of the set of controllable elements, wherein the modification includes a position change to a position of at least one controllable element; and generating an updated animated facial pose by applying the modified control values to the set of controllable elements to the animated character face.

11. A system for generating a first data structure usable for representing an animated facial pose applicable in an animation system to an artificial character, the system comprising:

a data interface configured to receive a first set of geometric parameters corresponding to a first set of markers, wherein the first set of geometric parameters represent respective positions of the first set of markers on a face of a human actor, and wherein the first set of geometric parameters correspond to a first facial pose performed by the human actor;

a memory for storing a deep learning network that has been trained to learn a transformation from characteristics of the face of the human actor performing a certain facial pose to characteristics of an animated character face performing the same certain facial pose; and a processor that executes a plurality of processor-executable instructions to perform operations comprising:

transforming the first set of geometric parameters into a blendshape of geometric parameters representing positions of a set of controllable elements that are distributed on the animated character face, wherein geometric position changes of the set of control elements cause a pose change from a first animated facial pose to a second animated facial pose on the animated character face;

generating the first animated facial pose on the animated character face by:

a) applying a first subset of control values from the blendshape of geometric parameters to a first subset of the set of controllable elements to generate a first region on the animated character face;

b) applying a second subset of control values from the blendshape of geometric parameters to a second subset of the set of controllable elements after the first region is generated to subsequently generate a second region on the animated character face; and c) fine-tuning a resulting animated facial pose constructed by the first region and the second region on the animated character face with a user input modifying the first subset of control values or the second subset of control values; and generating one or more animated facial poses on the animated character face resulting from varying control values for the set of controllable elements.

12. The system of claim 11, wherein the first set of markers includes any combination of a physical marker that is attached on the face of the human actor, a painted marker on the face of the human actor, a virtual marker that is projected on to the face of the human actor.

13. The system of claim 11, wherein the operations further comprise:

obtaining a time series of observations of the positions of the first set of markers;

training the deep learning network by reconstructing via the deep learning network one or more facial poses on the face of the human actor using the time series of observations of the positions; and generating, by the trained deep learning network, the one or more animated facial poses on the animated character faces.

14. The system of claim 11, wherein the set of controllable elements includes one or more control handles that is editable by an animation artist.

15. The system of claim 11, wherein the one or more animated facial poses on the animated character face are generated without constructing any mesh of a facial rig based on the face of the human actor to reduce computational complexity.

16. The system of claim 11, wherein the operation of applying the first subset of control values to the first subset comprises:

determining the first subset of control values from the blendshape of geometric parameters, wherein the first subset of control values reflect first geometric and positional characteristics of an eye area on the character face.

17. The system of claim 11, wherein the operation of applying the second subset of control values to the second subset of controllable elements comprises:

determining the second subset of control values from the blendshape of geometric parameters, wherein the second subset of control values reflect second geometric and positional characteristics of a jaw area on the character face.

18. The system of claim 11, wherein the operations further comprise:

receiving a training dataset of a plurality of sets of positions corresponding to the first set of markers, each set of positions being labeled with a corresponding set of blendshape of geometric parameters on the animated character face;

generating, via the deep learning network, a predicted blendshape of geometric parameters in response to an input set of positions corresponding to the first set of markers;

computing a training objective by comparing the predicted blendshape of geometric parameters with a set of ground-truth geometric parameters forming a corresponding facial pose on the animated character face; and updating the deep learning network based on the computed training objective.

19. The system of claim 11, wherein the operations further comprise:

receiving, via a user interface, a modification to control values of the set of controllable elements, wherein the modification includes a position change to a position of at least one controllable element; and generating an updated animated facial pose by applying the modified control values to the set of controllable elements to the animated character face.

20. A processor-readable non-transitory storage medium storing a plurality of processor-executable instructions for generating a first data structure usable for representing an animated facial pose applicable in an animation system to an artificial character, the instructions being executed by a processor for performing operations comprising:

receiving a first set of geometric parameters corresponding to a first set of markers, wherein the first set of geometric parameters represent respective positions of the first set of markers on a face of a human actor, and wherein the first set of geometric parameters correspond to a first facial pose performed by the human actor;

transforming, by a deep learning network that has been trained to learn a transformation from characteristics of the face of the human actor performing a certain facial pose to characteristics of an animated character face performing the same certain facial pose, the first set of geometric parameters into a blendshape of geometric parameters representing positions of a set of controllable elements that are distributed on the animated character face, wherein geometric position changes of the set of control elements cause a pose change from a first animated facial pose to a second animated facial pose on the animated character face;

generating the first animated facial pose on the animated character face by:

a) applying a first subset of control values from the blendshape of geometric parameters to a first subset of the set of controllable elements to generate a first region on the animated character face;

b) applying a second subset of control values from the blendshape of geometric parameters to a second subset of the set of controllable elements after the first region is generated to subsequently generate a second region on the animated character face; and c) fine-tuning a resulting animated facial pose constructed by the first region and the second region on the animated character face with a user input modifying the first subset of control values or the second subset of control values; and generating one or more animated facial poses on the animated character face resulting from varying control values for the set of controllable elements.

\* \* \* \* \*